US005888620A

United States Patent [19]

Grenier

[11] Patent Number: 5,888,620

[45] Date of Patent: Mar. 30, 1999

[54] PROCESS FOR MAKING A WOOD BOARD AND THE WOOD BOARD

[75] Inventor: Raoul Grenier, St-Prime, Canada

[73] Assignee: Coopérative Forestière Laterrière, Laterriére, Canada

[21] Appl. No.: 942,958

[22] Filed: Oct. 2, 1997

[30] Foreign Application Priority Data

Jan. 9, 1997 [CA] Canada .................................. 2194793

[51] Int. Cl.$^{6}$ .............................. B32B 3/00; B23B 31/18; B27M 1/00; B27F 1/00

[52] U.S. Cl. .......................... 428/172; 144/332; 144/347; 156/256; 156/304.1; 156/304.5; 156/204; 428/106; 428/114; 428/161; 428/535

[58] Field of Search .................................... 144/345, 346, 144/347, 348, 332, 350, 351; 156/154, 250, 254, 256, 257, 286, 304.1, 304.5; 428/106, 114, 161, 172, 535, 537.1

[56] References Cited

U.S. PATENT DOCUMENTS

| | | | |
|---|---|---|---|
| 1,778,333 | 10/1930 | Neumann . | |
| 2,589,316 | 3/1952 | Young | 154/133 |
| 2,942,635 | 6/1960 | Horne | 144/309 |
| 3,580,760 | 5/1971 | Koch | 156/64 |
| 3,908,725 | 9/1975 | Koch | 144/317 |
| 3,961,654 | 6/1976 | Hasenwinkle | 144/316 |
| 4,496,421 | 1/1985 | Byars et al. | 156/304.1 |
| 4,934,228 | 6/1990 | Bolton et al. | 83/23 |
| 5,002,105 | 3/1991 | Bodig | 144/346 |
| 5,034,259 | 7/1991 | Barker | 144/332 X |
| 5,059,472 | 10/1991 | Le Bell et al. | 428/161 |
| 5,135,597 | 8/1992 | Barker | 156/264 |

FOREIGN PATENT DOCUMENTS

| | | |
|---|---|---|
| 0029256 | 11/1980 | European Pat. Off. . |
| 0692372A1 | 1/1996 | European Pat. Off. . |
| WO 90/11488 | 10/1990 | WIPO . |

*Primary Examiner*—W. Donald Bray
*Attorney, Agent, or Firm*—Collard & Roe, P.C.

[57] ABSTRACT

The process for making a wood board comprises the steps of: a) providing elongated pieces of wood each from a coniferous wood and each having a rectangular cross section; b) detecting an average fiber density of each of the pieces of wood; c) selecting among the pieces of wood those having an average fiber density at least equal to a predetermined fiber density; d) planing off edges of the pieces of wood selected in step c); and e) bonding side by side the pieces of wood planed off in step d) by means of their edges to form the wood board. The board produced thereby shows excellent mechanical characteristics. An advantage of the present invention is to provide a process for making high strength lumber products from coniferous trees which are traditionally considered as nonstructural wood.

17 Claims, 3 Drawing Sheets

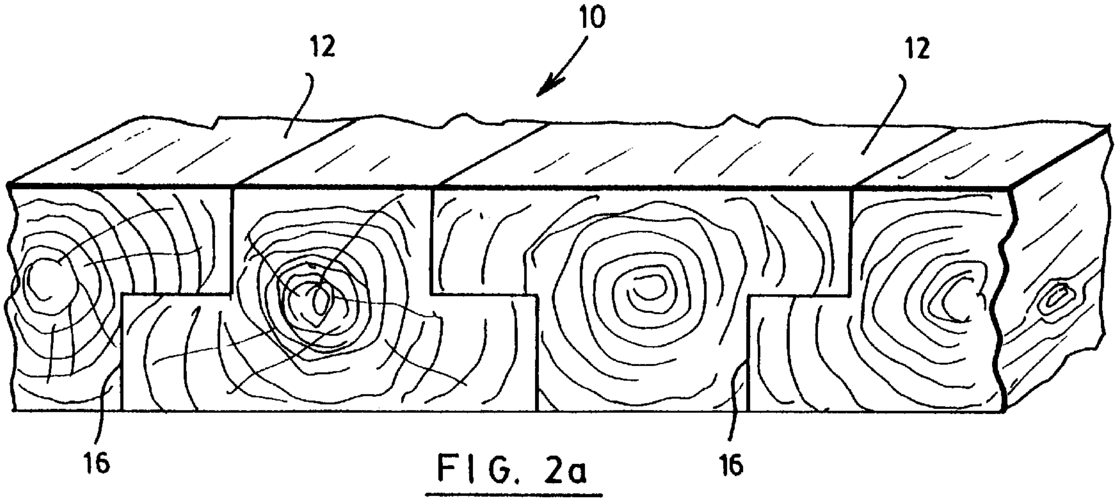
FIG. 2a
FIG. 2b
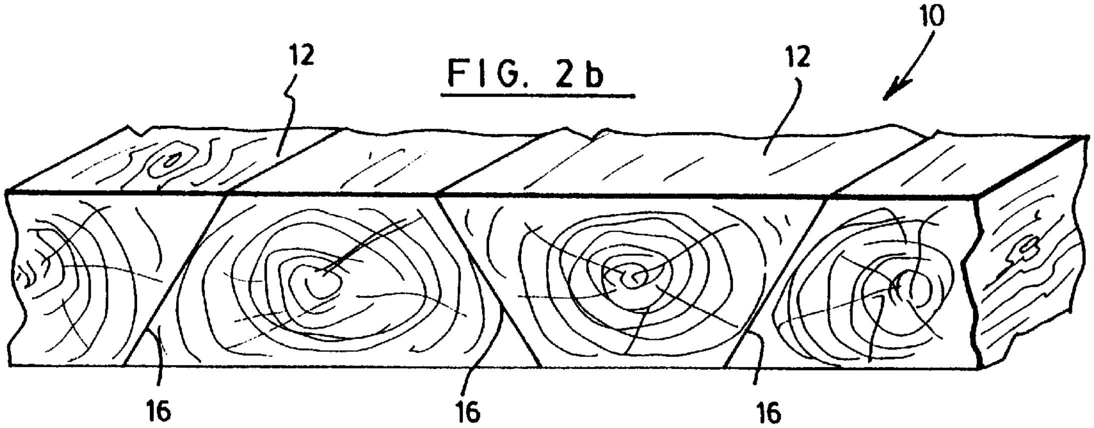
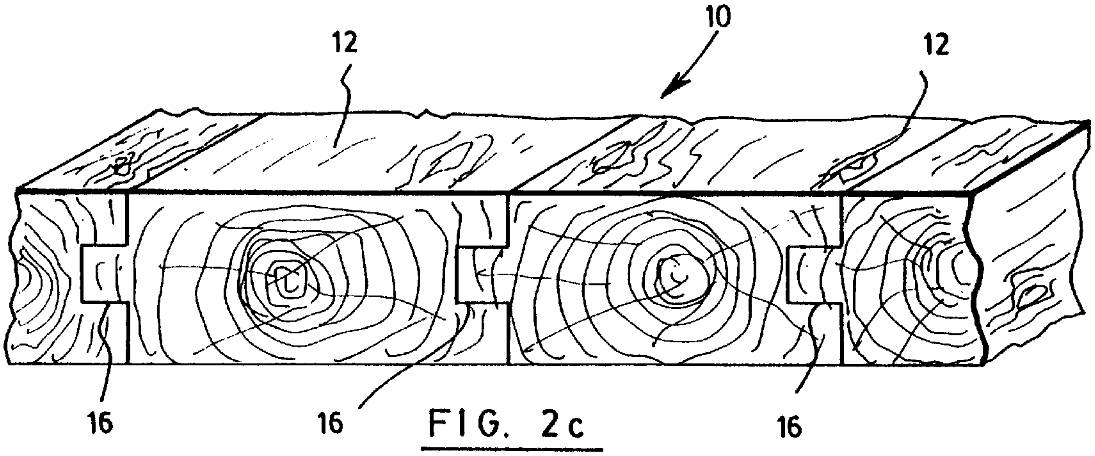
FIG. 2c

PROCESS FOR MAKING A WOOD BOARD AND THE WOOD BOARD

FIELD OF THE INVENTION

The present invention relates generally to the art of wood. More particularly, it concerns a process for making a wood board from coniferous trees and the wood board produced thereby.

BACKGROUND OF THE INVENTION

Coniferous trees such as black spruce, white spruce, red spruce, grey pine, balsam fir and larch, because of their small size, are traditionally known to produce low grade quality lumber products such as wood chips or 1"×3", 1"×4" and 1"×6" boards. Uses of those coniferous trees for structural purposes are very limited because of their inherent weakness. Presently, the demand for those low-grade quality products is not as high as the demand for high-grade quality and as can be easily understood, the latter is a lot more profitable for producers. Therefore, there is presently a need for a process that will permit new, interesting and profitable uses for those coniferous trees.

Known in prior art, there is U.S. Pat. No. 3,580,760 in the name of Koch. This document describes a process for making a laminated wood product utilizing modulus of elasticity measurement. An object of this process is the making of high strength laminates from boltwood trees which was then considered a nonstructural material because of its small size and its relatively high proportions of juvenile wood. This document teaches to arrange into a laminated structure the laminae that have the greatest deflection in the center of the structure and those with progressively less deflection located away from the center. As can be easily understood, this process is time-consuming and is not adapted to industrial production of wood board.

Also known in prior art, there is U.S. Pat. No. 3,961,654 in the name of Hasenwinkle, that describes a process for making a composite lumber product from a generally cylindrical log. The log is cut radially into a plurality of sector-shaped pieces. These pieces are rejoined two by two, by bonding them along opposed radial faces to form a parallelogram or a rectangle. A plurality of those parallelograms or rectangles are edge-bonded together into wider planar shapes. An object of the invention described therein is to manufacture composite lumber products that have improved quality.

Other examples of prior art related to the art of wood are described in the following references:

| | | |
|---|---|---|
| 3,580,760 | May 25, 1971 | P. Koch |
| 3,961,654 | June 8, 1976 | Hasenwinkle |
| 2,589,316 | March 18, 1952 | A. M. Young |
| 4,934,228 | June 19, 1990 | Bolton et al. |
| 5,059,472 | Oct. 22, 1991 | Le Bell et al. |
| 5,135,597 | Aug. 4, 1992 | Barker |
| 5,002,105 | Mar. 26, 1991 | Bodig |
| 1,778,333 | Oct. 14, 1930 | H. Neumann |
| 2,942,635 | June 28, 1960 | R. C. Horne |
| 5,648,027 | Jul. 15, 1997 | Tajiri et al. |
| 4,496,421 | Jan. 29, 1985 | Byars et al. |
| 3,908,725 | Sept. 30, 1975 | Koch |

An object of the present invention is to propose a process for making a wood board that satisfies the above-mentioned needs. More particularly, an object of the present invention is to propose a process for making a wood board from coniferous trees, the board produced thereby showing excellent mechanical characteristics.

Another object of the present invention is to provide a process for making a high strength structural wood board from coniferous trees which are traditionally considered as nonstructural wood.

SUMMARY OF THE INVENTION

Accordingly, the present invention relates to a process for making a wood board, the process comprising the steps of:

a) providing elongated pieces of wood each from a coniferous tree and each perferably having a rectangular cross section;

b) detecting an average fibre density of each of the pieces of wood;

c) selecting among the pieces of wood those having an average fibre density at least equal to a predetermined fiber density which is preferably equal to 0,420 g/cm$^3$;

d) planing off edges of the pieces of wood selected in step c); and e) bonding side by side the pieces of wood planed off in step d) by means of their edges to form the wood board.

Preferably, prior to step d), the pieces of wood selected in step c) are joined end to end to form a plurality of lamellae of wood and in step e) those lamellae are bonded side by side to form the wood board.

The coniferous tree is preferably selected from among black spruce, white spruce, red spruce, grey pine, balsam fir and larch. Most preferably, it is black spruce.

Also preferably, the above process comprises after step c), the additional step of removing any defect present in each of the pieces of wood selected in step c).

The present invention also relates to a wood board obtained by the process described above.

A further object of the present invention is to propose a structural wood board characterized in that it comprises a plurality of edge-bonded pieces of wood made of a coniferous tree selected from among black spruce, white spruce, red spruce, jack pine, balsam fir and larch, most preferably from black spruce.

Among others, the present invention provides new interesting and profitable uses for coniferous trees traditionally known as nonstructural material. The present invention also allows the quantity of wood required for any construction to be reduced without affecting the strength of the construction.

A non restrictive description of preferred embodiments of the invention will now be given with reference to the appended drawings.

DESCRIPTION OF A PREFERRED EMBODIMENT

Figure 1:
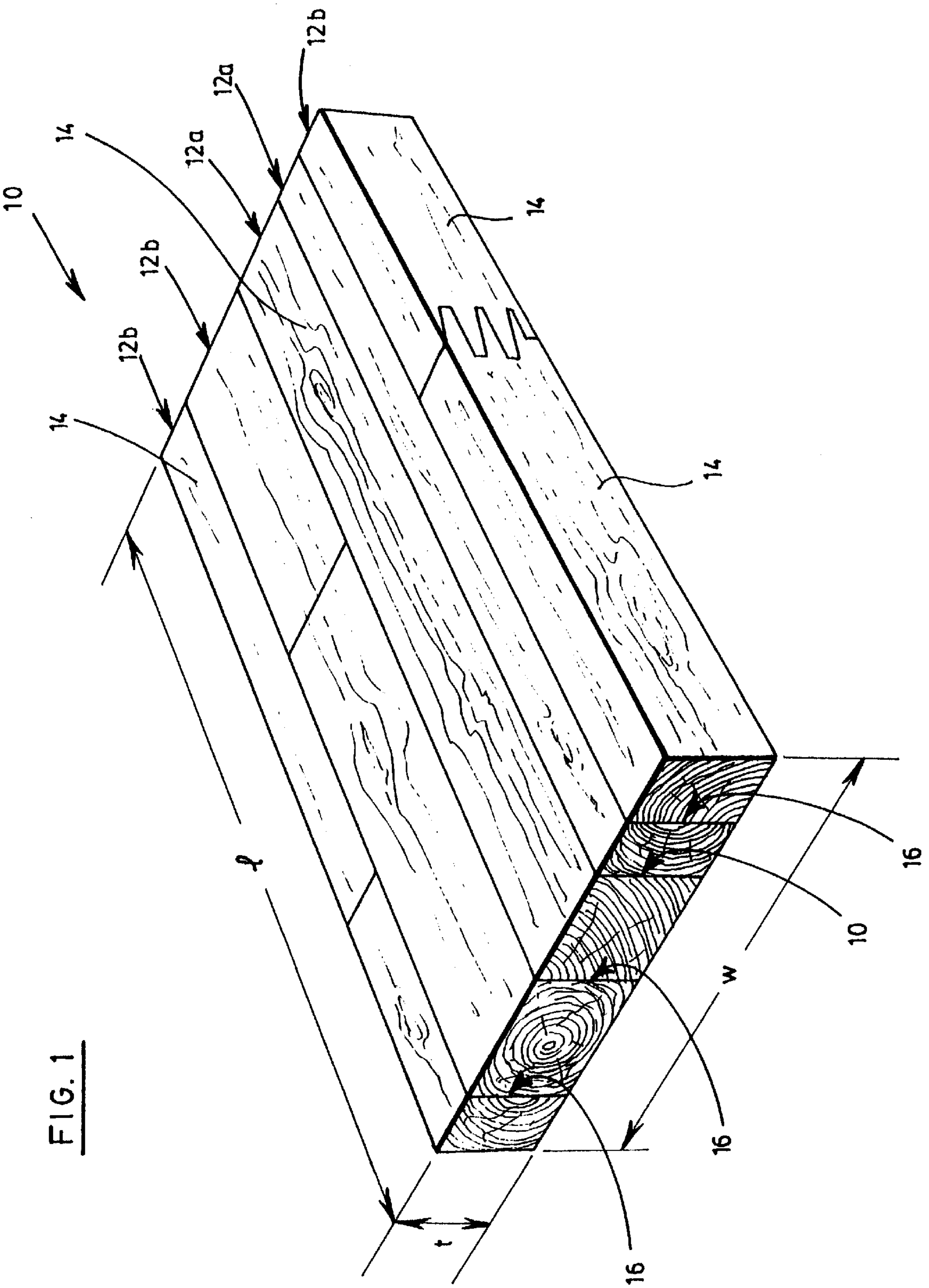
FIG. 1 is a perspective view of a wood board according to a preferred embodiment of the present invention.

Referring to FIG. 1, a wood board (10) according to a preferred embodiment of the present invention comprises a plurality of lamellae of wood (12*a* and 12*b*) edge joined together. Depending on the length of the board (10) required, each of the lamellae (12) preferably consist of a single pieces of wood (14) as for lamellae (12*a*) or consist of a plurality of pieces of wood (14), joined end to end in order to obtain a desired length for each lamella, as for lamellae (12*b*).

In general, the thickness (t) of a wood board (10) according to the present invention preferably varies approximately between 1.25 to 3.00 inches, the width (w) preferably varies between 1.50 to 96.00 inches and the length (1) preferably vary between 48 to 720 inches. However, it should be understood that a wood board according to the present invention may have other dimensions than the ones above without departing from the scope of the present invention.

Each lamella (12*a*,12*b*) preferably has a thickness comprised between 1.25 to 3.00 inches, a width varying from 0.5 to 4.00 inches and a length varying from 48 to 720 inches.

The length of each piece of wood (14) preferably varies from 8 to 96 inches.

Each piece of wood (14) comes from a coniferous tree and has been specifically selected in order to make a wood board of superior quality. This board shows uniform quality throughout and may be used for structural purposes. More particularly, only the pieces of wood (14) having at least a predetermined average fibre density are selected and any defect such as knots, blazes, blights, cracks, flaws or deviation present in each of the pieces of wood (14) selected have preferably been removed.

Each piece of wood (14) comes from a coniferous tree which is preferably selected from among black spruce, white spruce, red spruce, grey pine, balsam fir and larch. Most preferably, the coniferous tree is the black spruce.

In order to obtain a wood board that may compete with lumber products traditionally used for structural purposes, the average fiber density of each of the pieces selected is at least equal to 0.420 g/cm3. It has been discovered that among the pieces of wood coming from coniferous trees, the ones that show the best mechanical properties are those coming from the top of the tree or from stunted trees having a very slow growing rate. Those small trees may reach 120 years, thereby providing very close and dense fibers.

As already known in prior art, the mechanical properties of a piece of wood are directly related to its fiber density. Thus, selecting the pieces of wood according to their fiber density, also means that the selection is made according to their mechanical properties.

The lamellae (12) are joined edge to edge preferably by means of glue. The glue used is preferably a structural wood glue known in the art and may be selected from among pure resorcinol and phenol-resorcinol-formaldehyde (PRF) or it may be a nonstructural wood glue selected from among polyvinyl acetate (PVA), urea melamine (UM) or urea formaldehyde.

The edges (16) of the lamellae (12) may be plane, as shown in FIG. 1 or they may be profiled as shown in FIGS. 2*a*) to 2*g*).

Figure 2D:
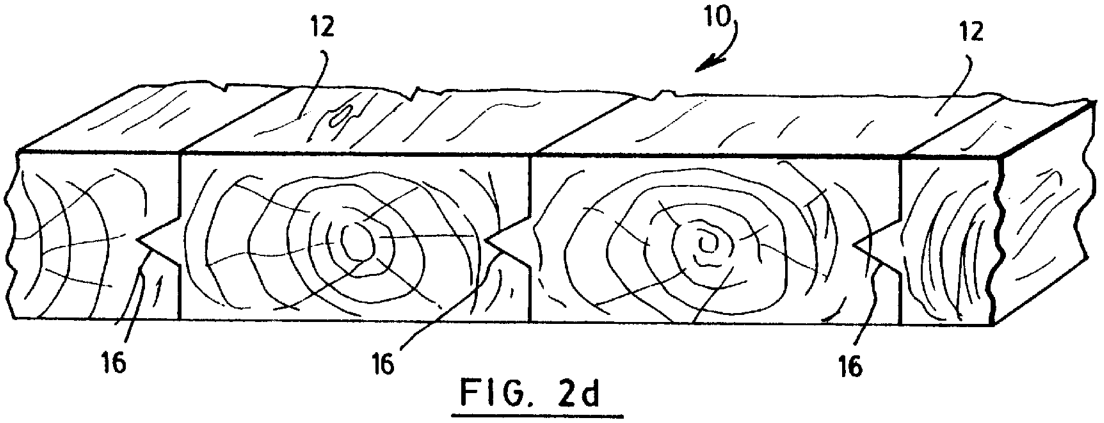
FIGS. 2*a*) to 2*g*) are each a perspective view of a wood board according respectively to another preferred embodiment of the present invention showing only an end portion of the board.
Figure 2E:
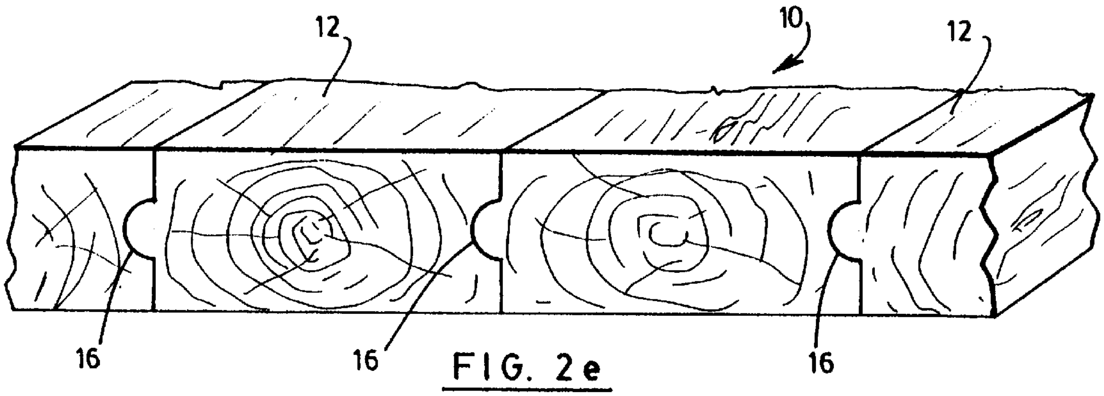
Figure 2F:
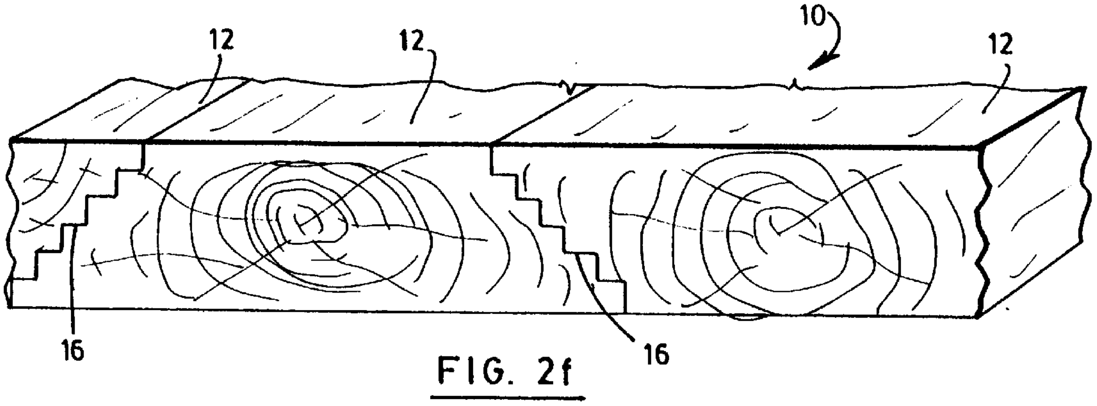
Figure 2G:
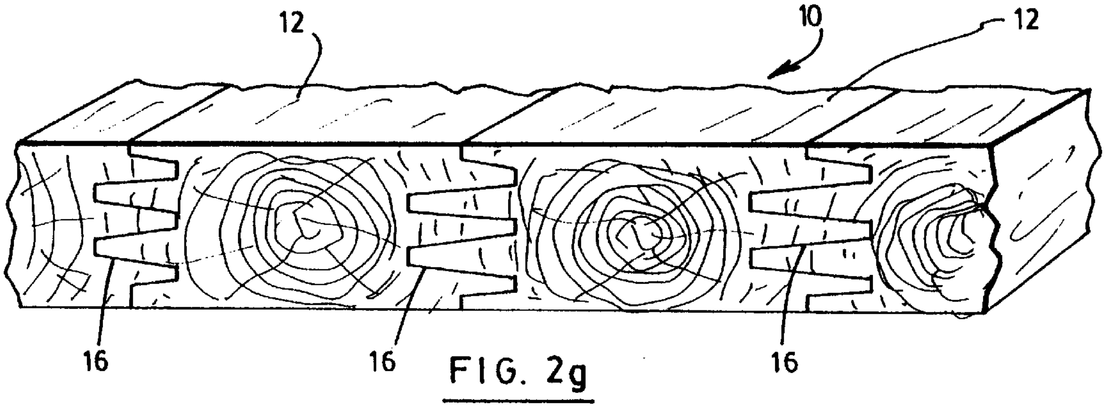

The profile is preferably selected from among a T-shaped profile as in FIG. 2*a*), an obliquely-shaped profile as in FIG. 2*b*), a squarely-shaped profile as in FIG. 2*c*), a triangularly-shaped profile as in FIG. 2*d*), a circularly-shaped profile as in FIG. 2*e*), a step-shaped profile as in FIG. 2*f*) and a finger-shaped profile as in FIG. 2*g*).

When the lamellae (12) are formed from a plurality of pieces of wood (14) joined end to end, those pieces (14) are preferably finger-jointed by means of glue as shown in FIG. 1. Finger jointing is already known in prior art and does not require further explanation.

BEST MODE OF REALIZATION OF A PROCESS ACCORDING TO THE PRESENT INVENTION

The process for making a wood board (10) as described above comprises the steps of:

- a) providing elongated pieces of wood (14) each from a coniferous tree and each having a rectangular cross section;
- b) detecting an average fiber density of each of the pieces of wood (14);
- c) selecting among the pieces of wood (14) those having an average fiber density at least equal to a predetermined fiber density;
- d) planing off edges of the pieces of wood (14) selected in step c); and
- e) bonding side by side the pieces of wood (14) planed off in step d) by means of their edges (16) to form the wood board.

In step e), the pieces of wood (14) are preferably edge-glued together by using an appropriate wood glue as described hereinbefore.

Preferably, if any piece of wood (14) selected in step c) is not long enough, for example if its length is less than 4 feet, the process comprises, prior to step d), an additional step of jointing end to end said pieces of wood (14) to form a plurality of lamellae of wood (12) and in step e) those lamellae (12) are bonded side by side to form the wood board (10). The jointing is preferably made with a finger-joint using an appropriate wood glue.

As mentioned before, in order to make a wood board (10) that may compete with traditional structural lumber products, the predetermined fiber density is approximately 0,420 g/cm$^3$.

Preferably, the process comprises, after step c), the additional step of removing any defect present in each of the pieces of wood (14) selected in step c).

The selection of the appropriate pieces of wood (14) is obtained by means of an electronic system which can first detect the fiber density at different locations along each piece of wood (14) passing through the system and then calculate the average fiber density of each of said pieces of wood (14). Preferably, the electronic system is adapted to detect any defect present in each of the pieces of wood (14) and to remove those defects therefrom.

The process may comprise, prior to step d) of planing off, a step of profiling edges (16) of the pieces of wood (14) as described hereinbefore and as shown in FIGS. 2*a*) to 2*g*).

In order to obtain a wood board (10) of a given width, the process preferably comprises, after step e) of bonding side by side the pieces of wood (14), an additional step of taking off sides of the wood board.

The sequence of steps for making a wood board (10) according to a preferred embodiment of the invention from the reception of the raw material to the final product may be the following:

- reception of the dry raw material which consists of a plurality of pieces of wood coming from different varieties of coniferous trees;
- stock piling the raw material;
- feeding the raw material to the mill;
- preheating the raw material;
- detection of the average fiber density of each of the pieces of wood;
- selection of the pieces of wood having an average fiber density at least equal to 0,420 g/cm$^3$;
- detecting and eliminating any defect present in each piece of wood;
- profiling the end joints;
- applying the glue on the profiles made;
- end jointing the pieces of wood and pressing the joints to form lamellae of wood;

hardening of the glue joints;

precision planing off of the lamellae;

application of glue on the edges of the lamellae;

edge bending the lamellae and pressing the lamellae to form a wood board;

hardening of the edge joints of the board;

trimming sides of the board to a desired width;

precision planing off of the board;

trimming ends of the board with precision;

piling and wrapping of the final product;

stocking the final product; and shipping the final product to the client.

As mentioned before, a wood board according to the present invention shows surprisingly improved mechanical properties. If each of the pieces of wood is selected such that its average fibre density is at least equal to 0,420 g/cm$^3$, the wood board produced therefrom according to the present invention may compete with any traditional structural lumber products. The following table I shows the mechanical properties of a wood board EGB(edge glued board) according to the present invention which has been tested in laboratory and the mechanical properties of conventional and engineered lumber product of the same size. The EGB mentioned therein comprises a plurality of edge glued pieces of wood, each free from any defect and having an average fiber density at least equal to 0,420 g/Cm$^3$.

TABLE I

Mechanical properties of a wood board according to the present invention as compared to conventional and engineered lumber products.

| LUMBER PRODUCT (Spruce, Pine, Fir) | MODULUS OF ELASTICITY (MPa) (E) | FLEXURAL STRENGTH ($F_b$) (MPa) | TENSILE STRENGTH (MPa) (F) | COMPRESSIVE STRENGTH (MPa) ($F_c$) |
|---|---|---|---|---|
| No. 2 Grade | 8,965 | 6.9 | 4.1 | 4.7 |
| No. 1 Grade | 10,345 | 8.3 | 5.0 | 6.0 |
| MSR* 1800 | 11,025 | 12.4 | 8.1 | 10.0 |
| MSR* 2100 | 12,405 | 14.5 | 10.9 | 11.7 |
| LVL* | 13,790 | 20.2 | 13.8 | 20.9 |
| Parallam* | 13,790 | 21.4 | 16.5 | 20.0 |
| Gang-Lam* LVL | 13,790 | 37.6 | 27.9 | 38.8 |
| EGB | 13,350 | 55.4 | 50.9 | 37.3 |

*Trade-marks MPa

As can be appreciated, the wood board obtained according to the present invention shows mechanical properties superior or equal to any known structural lumber product.

Therefore, a wood board according to the present invention may have many different uses in a framework. For example, it may be used as a frame wall, as a composing element of a truss, as a composing element of a floor beam, as a composing element of a laminated beam or as a joist.

As the raw material used in the making of a board according to the present invention comes from coniferous tree and most preferably from black spruce which are traditionally used for the production of wood chips or low grade quality boards, this invention will provide a new interesting market for these trees.

Although preferred embodiments of the invention have been described in detail herein and illustrated in the accompanying drawings, it is to be understood that the invention is not limited to these precise embodiments and that various changes and modifications may be effected therein without departing from the scope of the present invention.

What is claimed is:

1. A process for making a wood board, the process comprising the steps of:

a) providing elongated pieces of wood each from a coniferous tree;

b) detecting an average fiber density of each of the pieces of wood;

c) selecting among the pieces of wood those having an average fiber density at least equal to a predetermined fiber density;

d) planing off edges of the pieces of wood selected in step c); and e) bonding side by side the pieces of wood planed off in step d) by means of their edges to form the wood board.

2. A process according to claim 1, wherein, prior to step d), the pieces of wood selected in step c) are joined end to end to form a plurality of lamellae of wood and wherein, in step e), those lamellae are bonded side by side to form the wood board.

3. A process according to claim 2, wherein said predetermined fiber density is 0,420 g/cm3.

4. A process according to claim 1, wherein the coniferous tree is selected from among black spruce, white spruce, red spruce, grey pine, balsam fir and larch.

5. A process according to claim 4, wherein the coniferous tree is black spruce.

6. A process according to claim 1, comprising after step c), the additional step of removing any defect present in each of the pieces of wood selected in step c).

7. A process according to claim 6, comprising the additional step of profiling edges of the pieces of wood prior to step d).

8. A process according to claim 7, wherein the edges of the pieces of wood are profiled in a profile of a type selected from among a T-shaped, an oblique-shaped, a square-shaped, a triangular-shaped, a circular-shaped and a finger-shaped profile.

9. A process according to claim 6, wherein the ends of each piece of wood are glued together.

10. A process according to claim 9, wherein, in step d), the edges are glued together.

11. A process according to claim 10, comprising, after step e), the additional step of taking off sides of the wood board of step d) to obtain a wood board of a given width.

12. A process for making a wood board, the process comprising the steps of:

a) providing elongated pieces of wood each from a coniferous tree selected from among black spruce, white spruce, red spruce, grey pine, balsam fir and larch and each having a rectangular cross section;

b) detecting an average fiber density of each of the pieces of wood;

c) selecting among the pieces of wood those having an average fiber density at least equal to 0,420 g/cm3 and joining end to end the selected pieces of wood to form a plurality of lamellae of wood;

d) planing off edges of the lamellae of wood of step c) and profiling said edges; and e) bonding side by side the lamellae planed off in step d) by means of their edges to form the wood board.

13. A wood board obtained according to the process defined in claim 1.

14. A wood board obtained according to the process defined in claim 2.

15. A wood board obtained according to the process defined in claim 3.

16. A wood board obtained according to the process defined in claim 5.

17. A wood board obtained according to the process defined in claim 12.

* * * * *